United States Patent [19]
Gualtieri et al.

[11] Patent Number: 5,175,787
[45] Date of Patent: Dec. 29, 1992

[54] BIREFRINGENT OPTICAL WAVEGUIDES OF ALUMINUM GARNET

[75] Inventors: Devlin M. Gualtieri, Ledgewood; Janpu Hou, Bridgewater; Robert C. Morris, Ledgewood; Herman van de Vaart, Washington Township, Morris County, all of N.J.

[73] Assignee: Allied-Signal Inc., Morristownship, N.J.

[21] Appl. No.: 797,009

[22] Filed: Nov. 25, 1991

Related U.S. Application Data

[63] Continuation-in-part of Ser. No. 706,492, May 28, 1991, Pat. No. 5,113,472.

[51] Int. Cl.⁵ .............................................. G02B 1/37
[52] U.S. Cl. ..................................... 385/130; 385/141
[58] Field of Search ................................. 385/130–141

[56] References Cited
U.S. PATENT DOCUMENTS

| | | | |
|---|---|---|---|
| 3,764,195 | 10/1973 | Blank et al. | 385/130 |
| 4,092,060 | 5/1978 | Nunoshita et al. | 385/7 |
| 4,136,350 | 1/1979 | Tien | 385/1 |
| 4,743,083 | 5/1988 | Schimpe | 385/17 |
| 4,758,092 | 7/1988 | Heinrich et al. | 356/364 |
| 5,113,472 | 5/1992 | Gualtieri et al. | 385/130 |

*Primary Examiner*—Akim E. Ullah
*Attorney, Agent, or Firm*—Gerhard H. Fuchs; Richard C. Stewart

[57] ABSTRACT

This invention provides birefringent optical waveguide structures of crystalline aluminum garnet of a high refractive index which are clad with crystalline aluminum garnet of a lower refractive index. Due to predetermined lattice mismatch between garnet substrate and cladding layer, strain is induced which causes a stress with resultant birefringence in the waveguide layer. When linearly polarized light enters such stressed waveguide in certain orientations, the linear polarization will be preserved by the stress-induced birefringence. These birefringent clad waveguides can be in the form of slabs, channels, ribs, or any of the typical optical waveguide structures. They are useful at high temperature.

21 Claims, 6 Drawing Sheets

Birefringence of a 17 μm thick $(Tb,Lu)_3Al_5O_{12}$ Waveguiding Layer epitaxially deposited on YAG Birefringence of a 50 μm thick $(Tb,Lu)_3Al_5O_{12}$ Waveguiding Layer epitaxially deposited on YAG Birefringence of a 49 μm thick $Ho_3Al_5O_{12}$ Waveguiding Layer epitaxially deposited on YAG Birefringence of a 43 μm thick $Ho_3Al_5O_{12}$ Waveguiding Layer epitaxially deposited on YAG

BIREFRINGENT OPTICAL WAVEGUIDES OF ALUMINUM GARNET

CROSS-REFERENCE TO RELATED APPLICATION

This application is a continuation-in-part of commonly assigned copending U.S. application Ser. No. 706,492 filed 28 May 1991 now U.S. Pat. No. 5,113,472.

FIELD OF THE INVENTION

This invention relates to optical waveguides, and provides optical waveguide structures of crystalline aluminum garnet suitable for use in high temperature environments.

BACKGROUND OF THE INVENTION

Waveguides are structures which are used to conduct electromagnetic radiation from point to point, much as wire conducts electric current. In an optical waveguide, this electromagnetic radiation is light in either a narrow or broad range of wavelengths which may be contained in the visible spectrum, or the invisible spectra such as ultraviolet or infrared.

All forms of optical waveguides have as a waveguiding medium a material of high refractive index imbedded in a medium of lower refractive index. As an example, a glass fiber of refractive index 1.45, suspended in a vacuum or air of refractive index 1.0, will act as an optical waveguide. More usually, such waveguides are clad with a material, necessarily of lower refractive index, to protect them from ambient conditions. Foreign material in contact with an unclad waveguide will reduce its transmission efficiency by scatter of the waveguided light out of the waveguiding medium, and thus the need for cladding. An example of a clad waveguide is a germania ($GeO_2$) - doped silica ($SiO_2$) glass fiber coated with a layer of silica glass ($SiO_2$) for which there is a 1% difference in refractive index between the core and cladding.

High temperature waveguides are commonly made of sapphire, a crystal form of the high melting point oxide $Al_2O_3$ (melting point 2054° C.). Optical waveguides of sapphire have significant optical loss due to the lack of a suitable cladding material. A metal overcoat is used to protect such waveguides from the environment, but the transmission efficiency of this structure is low. A low loss optical waveguide requires a higher refractive index core surrounded by a lower refractive index cladding, and this is not provided in the metal-clad sapphire core waveguides.

P.J. Chandler et al. [P.J. Chandler et al., Electron. Lett. 25, 985 (1989)] have used an ion-implantation technique to produce a slab waveguide in the aluminum garnet $(Y,Nd)_3Al_5O_{12}$. This ion-implantation technique, unlike the technique of the present invention, makes use of the displacement of atoms in the crystal from their usual positions in the crystal lattice to generate regions of a small refractive index change. This ion-implantation technique is not suitable for use in high temperature waveguides, since the crystal structure will relax to its equilibrium state after exposure to high temperature.

P. K. Tien et al. [P. K. Tien et al., Appl. Phys. Lett. 21 (5), 207-209 (1972)] have described optical waveguides in gallium garnet and iron garnet films; specifically, $Eu_3Ga_5O_{12}$ on $Gd_3Sc_2Al_2O_3$ substrates and $Y_3Fe_{4.3}Sc_{0.7}O_{12}$ on $Gd_3Ga_5O_{12}$ substrates. The authors disclose that the aluminum and gallium rare earth garnets are transparent in the entire visible spectrum, and thus suitable for optical waveguides. Unsubstituted aluminum garnets such as yttrium aluminum garnet (YAG) were not considered by the authors as being suitable materials for waveguides. Neither clad waveguides nor specific compositions of epitaxial aluminum garnets as waveguiding compositions on aluminum garnet are suggested.

In an ideal waveguide, linear polarization of guided light would be maintained. However, in the real world, polarization in an actual waveguide changes, so that light that has traveled some distance in the waveguide emerges unpolarized. For some fiber optic sensors and advanced communication systems, it is required that the optical waveguides have polarization preserving properties. There are two types of polarization-sensitive single-mode waveguides. One type is a true single-polarization waveguide that can transmit light in one linear polarization but not in the other. The other type is birefringent and thus polarization-maintaining; that is, it maintains the polarization of the light that originally entered the waveguide by isolating the two orthogonal polarizations from each other while they travel down the same single-mode guide.

It is an object of the present invention to provide high temperature waveguides having a lower refractive index cladding, which waveguides further are birefringent and polarization maintaining.

SUMMARY OF THE INVENTION

This invention provides optical waveguide structures of a waveguiding crystalline aluminum garnet of a high refractive index which are clad with an epitaxial layer of an aluminum garnet having a lower refractive index. Lattice mismatch between the waveguiding aluminum garnet and the cladding layer imposes a strain on the waveguiding aluminum garnet, thereby causing a stress with resulting birefringence of the wave propagating in the high refractive index aluminum garnet.

Suitably, the aluminum garnets for the higher refractive index body of the waveguide and for the epitaxial cladding layer are selected from aluminum garnets of the composition $$R_3(Al, T)_5O_{12}$$

wherein

R represents one or more of the elements selected from the group consisting of calcium, magnesium, sodium, strontium, yttrium, lanthanum, praseodymium, neodymium, samarium, europium, gadolinium, terbium, dysprosium, holmium, erbium, thulium, ytterbium and lutetium; and T represents one or more of the 3-valent elements selected from the group consisting of gallium, indium, and scandium;

with the provisos that (1) the molar ratio of the combined concentration of indium plus scandium to aluminum does not exceed 2 : 3; and that (2) if R is one or more of $Na^{+1}$, $Ca^{+2}$, $Mg^{+2}$ or $Sr^{+2}$, then T must include one or more charge-compensating ions selected from the group consisting of $Fe^{+4}$, $Ge^{+4}$, $Hf^{+4}$, $Ir^{+4}$, $Mo^{+4}$, $Nb^{+4}$, $Os^{+4}$, $Pb^{+4}$, $Pt^{+4}$, $Re^{+4}$, $Rh^{+4}$, $Ru^{+4}$, $Si^{+4}$, $Sn^{+4}$, $Ta^{+4}$, $Ti^{+4}$, $Zr^{+4}$, $V^{+4}$, $W^{+4}$, $As^{+5}$, $Mo^{+5}$, $Nb^{+5}$, $Re^{+5}$, $Sb^{+5}$, $Ta^{+5}$, $U^{+5}$, $V^{+5}$, $Mo^{+6}$, $Re^{+6}$, $W^{+6}$, and $Re^{+7}$, in proportions sufficient to achieve an average cation charge of three in the crystal.

More desirably, R represents one or more of the elements selected from the group consisting of calcium, magnesium, yttrium, lanthanum, praseodymium, neodymium, samarium, europium, gadolinium, terbium, dysprosium, holmium, erbium, thulium, ytterbium and lutetium, and if R is one or both of $Ca^{+2}$ and $Mg^2$, then T should include one or both of $Ge^{+4}$ and $Si^{+4}$ in equimolar concentration relative to the $Ca^{+2}$ and/or $Mg^{+2}$ to achieve an average cation charge of three in the crystal.

An especially suitable aluminum garnet for the cladding layer is yttrium aluminum garnet, $Y_3Al_5O_{12}$ or "YAG".

The R and T elements in the aluminum garnet for the waveguide body and for the cladding layer, and their proportions, are selected to give as large as possible a refractive index difference while still maintaining the desired degree of lattice constant matching. In the event YAG is chosen for the epitaxial cladding layer, then the aluminum garnet compositions of the type $Tb_{1.75}Lu_{1.25}Al_5O_{12}$ and $Ho_3Al_5O_{12}$ have been found to meet the criteria of large difference in refractive indexes and required degree of lattice mismatch for stress-induced birefringence in the wave propagating layer particularly well.

BRIEF DESCRIPTION OF THE DRAWINGS

In the annexed drawings.

Figure 1:
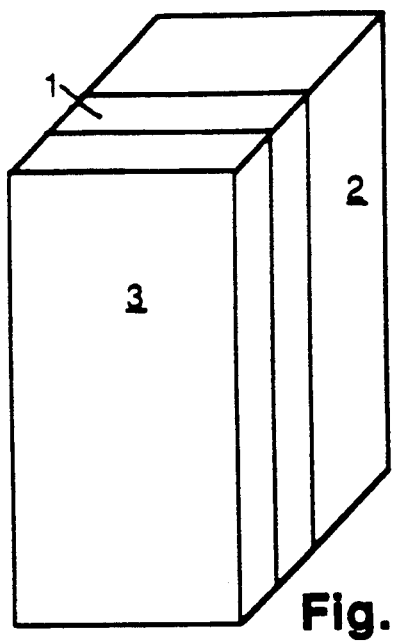
FIG. 1 illustrates a wave propagating layer (1) of an aluminum garnet of high refractive index—and lattice constant mismatched to YAG—epitaxially deposited on a YAG substrate (2) and then epitaxially overcoated with an epitaxial YAG layer (3) to form a "sandwich" structure in which a stressed high refractive index waveguiding layer is clad with the lower refractive index cladding layer in a "slab" waveguide geometry.

DETAILED DESCRIPTION OF THE INVENTION, OF THE PREFERRED EMBODIMENTS, AND OF THE BEST MODE PRESENTLY CONTEMPLATED FOR ITS PRACTICE

Garnets are oxides of the general composition $R_3T_5O_{12}$, wherein R and T respectively represent elements which form large and small ions of positive charge (cations). Garnets are resistant to chemical attack and high temperatures. There is much diversity in garnet composition, since R and T can be combinations of one or several elements cohabiting a crystal sublattice, and R and T range over much of the Periodic Table.

Aluminum garnets, $R_3Al_5O_{12}$, are mechanically strong and highly resistant to chemical attack. They are high temperature materials. Yttrium aluminum garnet (YAG) has a melting point of 1947° C. Other properties of YAG, which is a representative aluminum garnet, are a density of 4.55 g/cc, hardness of 8.5 Moh, thermal conductivity at 300 K of 0.13 W/cm/K, and a refractive index of 1.84 at 550 nm.

The aluminum garnets are optically transparent to long wavelengths. YAG is used as a host crystal for lasing ions, Nd:YAG being the prime example with laser emission at the infrared wavelength of 1.06 μm. The melting point of the aluminum garnets is nearly as large as that of sapphire. One advantage that the aluminum garnets have over sapphire in high temperature waveguide applications is that the infrared absorption edge of the former extends to longer wavelengths, allowing efficient use of these waveguides at longer wavelengths of light. Another advantage of the aluminum garnets is the mature state of the art of their epitaxial growth. The epitaxial crystal growth process allows deposition of garnet layers on garnet substrates. Waveguiding and cladding layers can be deposited by the epitaxial crystal growth process, facilitating fabrication of clad aluminum garnet optical waveguides.

The common technique for the epitaxial crystal growth of garnet is the liquid phase epitaxy technique, more specifically the horizontal dipping technique with rotation, as developed by H.J. Levinstein et al., (Appl. Phys. Lett. 19, 486 (1971)). The growth of an epitaxial garnet layer by liquid phase epitaxy typically proceeds as follows. A garnet substrate is carefully cleaned and mounted in a substrate holder which allows horizontal rotation and vertical translation. The substrate is then "dipped" by vertical translation into a tube furnace containing a platinum crucible holding the molten constituent oxides of the garnet which is to be epitaxially deposited. These oxides are dissolved in a suitable melt solvent, usually a lead oxide based solvent first heated to 1000° C. and then supercooled to about 20° C. below the temperature at which garnet crystals will grow (the saturation temperature).

The substrate submerged in the growth solution is rotated at about 100-250 rev/min, and a garnet layer is epitaxially grown on the substrate at a rate of about 0.5-1.0 μm/min. After time sufficient for growth of the desired layer thickness, the substrate is pulled vertically from the growth solution, and the clinging solution is "spun-off" at high speed. The substrate, now with an epitaxial layer, is removed from the furnace, and remaining traces of solidified growth solution are removed by treatment with a suitable solvent, usually hot nitric acid.

As this epitaxial crystal growth technique is in common and widespread use, the distinguishing features of this invention are the compositions of the epitaxial crystals and the compositions of the melts from which they are grown.

Purity of starting materials is important, since many impurity components could cause optical absorption in the waveguides and reduce the transmission efficiency in spectral regions desired for signalling. For example, holmium, a rare-earth impurity, absorbs strongly at the wavelength of a red helium-neon gas laser, 632.8 nm. The rare earths are chemically similar and difficult to separate, so that such impurity absorption is a common problem. In general, the purity of the rare earth components of a melt should be at least 99.9%, and the purity of the lead oxide solvent should be at least 99.999%.

Substitutions of elements in YAG can greatly increase the refractive index. For example, substitution of some of the aluminum by scandium to form yttrium scandium aluminum garnet ($Y_3Sc_2Al_3O_{12}$ or "YSAG") increases the refractive index from 1.84 to 1.88 at visible wavelengths. Simultaneous replacement of yttrium by gadolinium and aluminum by scandium forms gadolinium scandium aluminum garnet ($Gd_3Sc_2Al_3O_{12}$ or "GSAG"), having a refractive index of 1.97 at visible wavelengths.

Fabrication of high temperature optical waveguides in accordance with the present invention involves cladding an aluminum garnet substrate of desired waveguiding configuration with an epitaxial aluminum garnet layer having a lower refractive index than the substrate. The two aluminum garnet compositions are chosen such that there is a lattice constant mismatch sufficient to provide a strain of at least about 0.001% on the waveguiding aluminum garnet layer.

The body of the optical waveguide within which the light is transmitted is always formed of a single crystal. Optical waveguiding structures of aluminum garnet can be fabricated in a variety of forms, such as slabs, channels, or ribs. For example, with reference to FIG. 1, an epitaxial layer 1 of an aluminum garnet of high refractive index and lattice constant match to YAG can be epitaxially deposited on a YAG substrate 2 and then epitaxially overcoated with a further epitaxial YAG layer 3 to form a "sandwich" structure in which the high refractive index waveguiding layer 1 is clad with the lower refractive index cladding layers 2 and 3 in a "slab" waveguide geometry.

Figure 2:
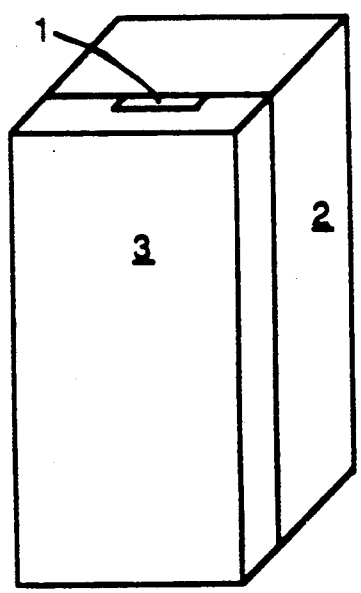
FIG. 2 illustrates a rib waveguide produced by an epitaxial as the slab guide of FIG. 1, except that the waveguiding layer is patterned into a "rib" before cladding (reference numerals as in FIG. 1)

A rib waveguide as illustrated by FIG. 2 can be produced by the same epitaxial process as the slab of FIG. 1, except that the higher refractive index waveguiding layer 31 (which has been epitaxially deposited on lower refractive index substrate 32) is patterned into a "rib" before it is epitaxially clad with lower refractive index layer 33. Such "rib" waveguides have been produced in iron garnets by Pross et al. [E.Pross et al., Appl. Phys. Lett. 52, 682 (1988)]. Similar waveguides in iron garnet have been reported by R. Wolfe et al. [R. Wolfe et al., J. Appl. Phys. 56, 426 (1990); J. Appl. Phys. 57, 960 (1990)].

Figure 3:
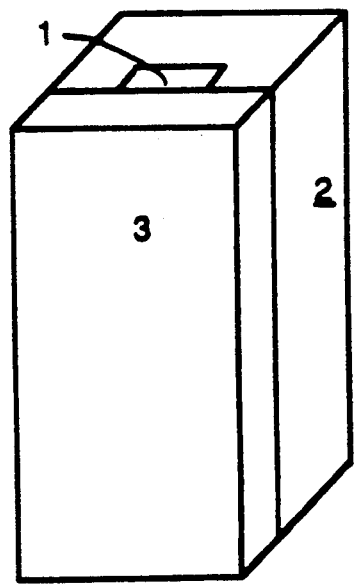
FIG. 3 illustrates a channel waveguide formed as a variation of a rib waveguide in which the guiding material is deposited in a channel in the substrate layer before cladding (reference numerals as in FIG. 1)

A channel waveguide as illustrated by FIG. 3 is a variation of a rib waveguide in which the guiding aluminum garnet crystal 41 is deposited in a channel in the substrate 42, and then clad with a further layer 43.

The lattice mismatch between the higher refractive waveguiding layer and the lower refractive index cladding layer is sufficient to impose a strain of at least about 0.001%, desirably of from about 0.001% to about 0.15%, more preferably of at least about 0.01% to about 0.14% on the waveguiding layer, to thereby induce a stress therein so as to make the waveguiding layer sufficiently birefringent to permit maintenance of polarization of polarized light propagated therein.

The difference in refractive index between the higher refractive index aluminum garnet single crystal waveguiding body and the lower refractive index epitaxial aluminum garnet coating should be at least about 0.02%, preferably at least about 0.1%, more preferably at least about 0.5%. There is no upper limit on the difference in refractive indices. Any aluminum garnet combination having sufficiently different refractive indices is suitable for present purposes, so long as the lattice constants of these garnets are sufficiently close to permit epitaxial deposition of one on the other, yet sufficiently large to impose a strain of at least about 0.001% on the waveguiding aluminum garnet. To permit such epitaxial deposition, the lattice mismatch should not be larger than about 0.14%, desirably not larger than about 0.15%. Preferably, it is less than about 0.05%, but in any event it must be larger than about 0.001%.

The refractive index of aluminum garnet can be predicted to serve as a guide to composition selection for use in the waveguides of the present invention, as described by K. Nassau, Physics Today, Sept. 1984, p. 42 in an article entitled "Dispersion—Our Current Understanding".Briefly, the refractive index of aluminum garnets is a function of wavelength, and the ultraviolet and infrared absorption bands of the crystal. Knowledge of the absorption parameters (which can be readily determined using conventional procedures) allows calculation of the refractive index for a particular composition at any wavelength by the "Sellmeier" equation. For example, a linear combination of the refractive indices of the terminal aluminum garnet compositions $(R^1)_3(Al,T^1)_5O_{12}$ and $(R^2)_3(Al,T^2)_5O_{12}$ is sufficient to give the refractive index of any intermediate aluminum garnet composition $(R^1, R^2)_3(Al, T^1, T^2)_5O_{12}$.

The lattice constants of the aluminum garnets useful for making the present waveguides are determined using conventional X-ray diffraction procedures, as for example described in W. L. Bond, Precision Lattice Constant Determination, Acta Cryst. 13, 814–818 (1960); W. L. Bond, Precision Lattice Constant Determination: Erratum, Acta Cryst. A31, 698 (1975); and R. L. Barnes, A Survey of Precision Lattice Parameter Measurements as a Tool for the Characterization of Single-Crystal Materials, Mat. Res. Bull. 2, 273–282 (1967).

An exemplary procedure for X-ray measurement of strain in aluminum garnet epitaxial waveguiding layers on garnet substrate wafers employed by us is as follows. Lattice constant measurement of epitaxial waveguiding layers of aluminum garnet on YAG is by standard X-ray diffraction techniques. The (444) and (888) reflections of the garnet diffraction of the (111) layers and wafer substrates are observed with Cu K-alpha-1 radiation collimated by a germanium first crystal in a double-crystal diffractometer. Because of the Poisson distortion of the lattice constants as measured in the direction perpendicular to the plane of the wafer substrates, the following equation is used to calculate the mismatch of lattice constant between the epitaxial layer and the substrate crystal wafer from the mismatch measured in the direction normal to the plane:

$$(\Delta a/a) = [(1-v)/(1+v)] (\Delta d/d)$$

where $(\Delta a/a)$ is the corrected lattice constant mismatch, $(\Delta d/d)$ is the lattice constant mismatch measured along the direction normal to the plane of the substrate, and $v$ is the Poisson ratio. For aluminum garnets, $[(1-v)/(1+v)] \approx 0.6$.

For layer compositions of the general formula $(Y_{1-a-b} R^1{}_a R^2{}_b)_3Al_3(Al_{1-c} Sc_c)_2O_{12}$ this strain of the epitaxial layer on $Y_3Al_5O_{12}$ can be expressed as $Strain(\%) = (a)(k_1) + (b)(k_2) + (c)(2.25)$ where $k_1, k_2$ are selected from Table 1, below:

TABLE 1

| $R^1, R^2$ | $k_1, k_2$ |
|---|---|
| Lu | −0.73 |
| Yb | −0.59 |
| Tm | −0.36 |
| Er | −0.16 |
| Y | 0.0 |
| Ho | 0.01 |
| Dy | 0.35 |
| Tb | 0.62 |
| Gd | 0.94 |
| Eu | 1.02 |
| Sm | 1.40 |
| Nd | 1.95 |
| Pr | 2.33 |
| La | 3.07 |

Table 2, below, list exemplary aluminum garnet compositions suitable for the polarization-maintaining waveguides of the present invention, which acquire a strain of about 0.01% on yttrium aluminum garnet (YAG):

Table 2

$Lu_{0.94}Dy_{2.06}Al_5O_{12}$
$Lu_{1.36}Tb_{1.64}Al_5O_{12}$
$Lu_{1.67}Gd_{1.33}Al_5O_{12}$
$Lu_{1.73}Eu_{1.27}Al_5O_{12}$
$Lu_{1.96}Sm_{1.04}Al_5O_{12}$
$Lu_{2.17}Nd_{0.83}Al_5O_{12}$
$Lu_{2.27}Pr_{0.73}Al_5O_{12}$
$Lu_{2.42}La_{0.58}Al_5O_{12}$
$Yb_{1.09}Dy_{1.91}Al_5O_{12}$
$Yb_{1.51}Tb_{1.49}Al_5O_{12}$
$Yb_{1.82}Gd_{1.18}Al_5O_{12}$
$Yb_{1.88}Eu_{1.12}Al_5O_{12}$
$Yb_{2.10}Sm_{0.90}Al_5O_{12}$
$Yb_{2.29}Nd_{0.71}Al_5O_{12}$
$Yb_{2.38}Pr_{0.62}Al_5O_{12}$
$Yb_{2.51}La_{0.49}Al_5O_{12}$
$Tm_{1.44}Dy_{1.56}Al_5O_{12}$
$Tm_{1.87}Tb_{1.13}Al_5O_{12}$
$Tm_{2.15}Gd_{0.85}Al_5O_{12}$
$Tm_{2.20}Eu_{0.80}Al_5O_{12}$
$Tm_{2.37}Sm_{0.63}Al_5O_{12}$
$Tm_{2.52}Nd_{0.48}Al_5O_{12}$
$Tm_{2.59}Pr_{0.41}Al_5O_{12}$
$Tm_{2.68}La_{0.32}Al_5O_{12}$
$Er_{2.00}Dy_{1.00}Al_5O_{12}$
$Er_{2.35}Tb_{0.65}Al_5O_{12}$
$Er_{2.54}Gd_{0.46}Al_5O_{12}$
$Er_{2.57}Eu_{0.43}Al_5O_{12}$
$Er_{2.67}Sm_{0.33}Al_5O_{12}$
$Er_{2.76}Nd_{0.24}Al_5O_{12}$
$Er_{2.80}Pr_{0.20}Al_5O_{12}$
$Er_{2.84}La_{0.16}Al_5O_{12}$
$Y_{2.91}Dy_{0.09}Al_5O_{12}$
$Y_{2.95}Tb_{0.05}Al_5O_{12}$
$Y_{2.97}Gd_{0.03}Al_5O_{12}$
$Y_{2.97}Eu_{0.03}Al_5O_{12}$
$Y_{2.98}Sm_{0.02}Al_5O_{12}$
$Y_{2.98}Nd_{0.02}Al_5O_{12}$
$Y_{2.99}Pr_{0.01}Al_5O_{12}$
$Y_{2.99}La_{0.01}Al_5O_{12}$
$Ho_{3.00}Al_5O_{12}$
$Lu_3Sc_{0.66}Al_{4.34}O_{12}$
$Yb_3Sc_{0.53}Al_{4.47}O_{12}$
$Tm_3Sc_{0.33}Al_{4.67}O_{12}$
$Er_3Sc_{0.15}Al_{4.85}O_{12}$
$Y_3Sc_{0.01}Al_{4.99}O_{12}$

Table 3, below, list exemplary aluminum garnet compositions suitable for the polarization-maintaining waveguides of the present invention, which acquire a strain of about 0.025% on yttrium aluminum garnet (YAG):

Table 3

$Lu_{0.90}Dy_{2.10}Al_5O_{12}$
$Lu_{1.32}Tb_{1.68}Al_5O_{12}$
$Lu_{1.64}Gd_{1.36}Al_5O_{12}$
$Lu_{1.71}Eu_{1.29}Al_5O_{12}$
$Lu_{1.94}Sm_{1.06}Al_5O_{12}$
$Lu_{2.15}Nd_{0.85}Al_5O_{12}$
$Lu_{2.26}Pr_{0.74}Al_5O_{12}$
$Lu_{2.40}La_{0.60}Al_5O_{12}$
$Yb_{1.04}Dy_{1.96}Al_5O_{12}$
$Yb_{1.48}Tb_{1.52}Al_5O_{12}$
$Yb_{1.79}Gd_{1.21}Al_5O_{12}$
$Yb_{1.85}Eu_{1.15}Al_5O_{12}$
$Yb_{2.07}Sm_{0.93}Al_5O_{12}$
$Yb_{2.27}Nd_{0.73}Al_5O_{12}$
$Yb_{2.37}Pr_{0.63}Al_5O_{12}$
$Yb_{2.50}La_{0.50}Al_5O_{12}$
$Tm_{1.37}Dy_{1.63}Al_5O_{12}$
$Tm_{1.82}Tb_{1.18}Al_5O_{12}$
$Tm_{2.11}Gd_{0.89}Al_5O_{12}$
$Tm_{2.16}Eu_{0.84}Al_5O_{12}$
$Tm_{2.34}Sm_{0.66}Al_5O_{12}$
$Tm_{2.50}Nd_{0.50}Al_5O_{12}$
$Tm_{2.57}Pr_{0.43}Al_5O_{12}$
$Tm_{2.66}La_{0.34}Al_5O_{12}$
$Er_{1.91}Dy_{1.09}Al_5O_{12}$
$Er_{2.29}Tb_{0.71}Al_5O_{12}$
$Er_{2.50}Gd_{0.50}Al_5O_{12}$
$Er_{2.53}Eu_{0.47}Al_5O_{12}$
$Er_{2.64}Sm_{0.36}Al_5O_{12}$
$Er_{2.74}Nd_{0.26}Al_5O_{12}$
$Er_{2.78}Pr_{0.22}Al_5O_{12}$
$Er_{2.83}La_{0.17}Al_5O_{12}$
$Y_{2.79}Dy_{0.21}Al_5O_{12}$
$Y_{2.88}Tb_{0.12}Al_5O_{12}$
$Y_{2.92}Gd_{0.08}Al_5O_{12}$
$Y_{2.93}Eu_{0.07}Al_5O_{12}$
$Y_{2.95}Sm_{0.05}Al_5O_{12}$
$Y_{2.96}Nd_{0.04}Al_5O_{12}$
$Y_{2.97}Pr_{0.03}Al_5O_{12}$
$Y_{2.98}La_{0.02}Al_5O_{12}$
$Ho_{2.87}Dy_{0.13}Al_5O_{12}$ $Ho_{2.93}Tb_{0.07}Al_5O_{12}$
$Ho_{2.95}Gd_{0.05}Al_5O_{12}$
$Ho_{2.96}Eu_{0.04}Al_5O_{12}$
$Ho_{2.97}Sm_{0.03}Al_5O_{12}$
$Ho_{2.98}Nd_{0.02}Al_5O_{12}$
$Ho_{2.98}Pr_{0.02}Al_5O_{12}$
$Ho_{2.99}La_{0.01}Al_5O_{12}$
$Lu_3Sc_{0.67}Al_{4.33}O_{12}$
$Yb_3Sc_{0.55}Al_{4.45}O_{12}$
$Tm_3Sc_{0.34}Al_{4.66}O_{12}$
$Er_3Sc_{0.16}Al_{4.84}O_{12}$
$Y_3Sc_{0.02}Al_{4.98}O_{12}$
$Ho_3Sc_{0.01}Al_{4.99}O_{12}$ $Ho_{2.80}Tb_{0.20}Al_5O_{12}$
$Ho_{2.87}Gd_{0.13}Al_5O_{12}$
$Ho_{2.88}Eu_{0.12}Al_5O_{12}$
$Ho_{2.91}Sm_{0.09}Al_5O_{12}$
$Ho_{2.94}Nd_{0.06}al_5O_{12}$
$Ho_{2.95}Pr_{0.05}Al_5O_{12}$
$Ho_{2.96}La_{0.04}Al_5O_{12}$
$Lu_3Sc_{0.69}Al_{4.31}O_{12}$
$Yb_3Sc_{0.57}Al_{4.43}O_{12}$
$Tm_3Sc_{0.36}Al_{4.64}O_{12}$
$Er_3Sc_{0.19}Al_{4.81}O_{12}$
$Y_3Sc_{0.04}Al_{4.96}O_{12}$
$Ho_3Sc_{0.04}Al_{4.96}O_{12}$

Table 4, below, list exemplary aluminum garnet compositions suitable for the polarization-maintaining waveguides of the present invention, which acquire a strain of about 0.05% on yttrium aluminum garnet (YAG):

TABLE 4

$Lu_{0.83}Dy_{2.17}Al_5O_{12}$
$Lu_{1.27}Tb_{1.73}Al_5O_{12}$
$Lu_{1.60}Gd_{1.40}Al_5O_{12}$
$Lu_{1.66}Eu_{1.34}Al_5O_{12}$
$Lu_{1.90}Sm_{1.10}Al_5O_{12}$
$Lu_{2.13}Nd_{0.87}Al_5O_{12}$
$Lu_{2.24}Pr_{0.76}Al_5O_{12}$
$Lu_{2.38}La_{0.62}Al_5O_{12}$
$Yb_{0.96}Dy_{2.04}Al_5O_{12}$
$Yb_{1.41}Tb_{1.59}Al_5O_{12}$
$Yb_{1.75}Gd_{1.25}Al_5O_{12}$
$Yb_{1.81}Eu_{1.19}Al_5O_{12}$
$Yb_{2.04}Sm_{0.96}Al_5O_{12}$
$Yb_{2.24}Nd_{0.76}Al_5O_{12}$
$Yb_{2.34}Pr_{0.66}Al_5O_{12}$
$Yb_{2.48}La_{0.52}Al_5O_{12}$
$Tm_{1.27}Dy_{1.73}Al_5O_{12}$
$Tm_{1.74}Tb_{1.26}Al_5O_{12}$
$Tm_{2.05}Gd_{0.95}Al_5O_{12}$
$Tm_{2.11}Eu_{0.89}Al_5O_{12}$
$Tm_{2.30}Sm_{0.70}Al_5O_{12}$
$Tm_{2.47}Nd_{0.53}Al_5O_{12}$
$Tm_{2.54}Pr_{0.46}Al_5O_{12}$
$Tm_{2.64}La_{0.36}Al_5O_{12}$
$Er_{1.76}Dy_{1.24}Al_5O_{12}$
$Er_{2.19}Tb_{0.81}Al_5O_{12}$
$Er_{2.43}Gd_{0.57}Al_5O_{12}$
$Er_{2.47}Eu_{0.53}Al_5O_{12}$
$Er_{2.60}Sm_{0.40}Al_5O_{12}$
$Er_{2.70}Nd_{0.30}Al_5O_{12}$
$Er_{2.75}Pr_{0.25}Al_5O_{12}$
$Er_{2.80}La_{0.20}Al_5O_{12}$
$Y_{2.57}Dy_{0.43}Al_5O_{12}$
$Y_{2.76}Tb_{0.24}Al_5O_{12}$
$Y_{2.84}Gd_{0.16}Al_5O_{12}$
$Y_{2.85}Eu_{0.15}Al_5O_{12}$
$Y_{2.89}Sm_{0.11}Al_5O_{12}$
$Y_{2.92}Nd_{0.08}Al_5O_{12}$
$Y_{2.94}Pr_{0.06}Al_5O_{12}$
$Y_{2.95}La_{0.05}Al_5O_{12}$
$Ho_{2.65}Dy_{0.35}Al_5O_{12}$

Table 5, below, list exemplary aluminum garnet compositions suitable for the polarization-maintaining waveguides of the present invention, which acquire a strain of about 0.1% on yttrium aluminum garnet (YAG:

TABLE 5

$Lu_{0.69}Dy_{2.31}Al_5O_{12}$
$Lu_{1.16}Tb_{1.84}Al_5O_{12}$
$Lu_{1.51}Gd_{1.49}Al_5O_{12}$
$Lu_{1.58}Eu_{1.42}Al_5O_{12}$
$Lu_{1.83}Sm_{1.17}Al_5O_{12}$
$Lu_{2.07}Nd_{0.93}Al_5O_{12}$
$Lu_{2.19}Pr_{0.81}Al_5O_{12}$
$Lu_{2.34}La_{0.66}al_5O_{12}$
$Yb_{0.80}Dy_{2.20}Al_5O_{12}$
$Yb_{1.29}Tb_{1.71}Al_5O_{12}$
$Yb_{1.65}Gd_{1.35}Al_5O_{12}$
$Yb_{1.71}Eu_{1.29}Al_5O_{12}$
$Yb_{1.96}Sm_{1.04}Al_5O_{12}$
$Yb_{2.19}Nd_{0.81}Al_5O_{12}$
$Yb_{2.29}Pr_{0.71}Al_5O_{12}$
$Yb_{2.43}La_{0.57}Al_5O_{12}$
$Tm_{1.06}Dy_{1.94}Al_5O_{12}$
$Tm_{1.59}Tb_{1.41}Al_5O_{12}$
$Tm_{1.94}Gd_{1.06}Al_5O_{12}$
$Tm_{2.00}Eu_{1.00}Al_5O_{12}$
$Tm_{2.22}Sm_{0.78}Al_5O_{12}$
$Tm_{2.40}Nd_{9.60}Al_5O_{12}$
$Tm_{2.49}Pr_{0.51}Al_5O_{12}$
$Tm_{2.60}La_{0.40}Al_5O_{12}$
$Er_{1.47}Dy_{1.53}Al_5O_{12}$
$Er_{2.00}Tb_{1.00}Al_5O_{12}$
$Er_{2.29}Gd_{0.71}Al_5O_{12}$
$Er_{2.34}Eu_{0.66}Al_5O_{12}$
$Er_{2.50}Sm_{0.50}Al_5O_{12}$
$Er_{2.63}Nd_{0.37}Al_5O_{12}$
$Er_{2.69}Pr_{0.31}Al_5O_{12}$
$Er_{2.76}La_{0.24}Al_5O_{12}$
$Y_{2.14}Dy_{0.86}Al_5O_{12}$
$Y_{2.52}Tb_{0.48}Al_5O_{12}$
$Y_{2.68}Gd_{0.32}Al_5O_{12}$
$Y_{2.71}Eu_{0.29}Al_5O_{12}$
$Y_{2.79}Sm_{0.21}Al_5O_{12}$
$Y_{2.85}Nd_{0.15}Al_5O_{12}$
$Y_{2.87}Pr_{0.13}Al_5O_{12}$
$Y_{2.90}La_{0.10}Al_5O_{12}$
$Ho_{2.21}Dy_{0.79}Al_5O_{12}$ $Ho_{2.56}Tb_{0.44}Al_5O_{12}$
$Ho_{2.71}Gd_{0.29}Al_5O_{12}$
$Ho_{2.73}Eu_{0.27}Al_5O_{12}$
$Ho_{2.81}Sm_{0.19}Al_5O_{12}$
$Ho_{2.86}Nd_{0.14}Al_5O_{12}$
$Ho_{2.88}Pr_{0.12}Al_5O_{12}$
$Ho_{2.91}La_{0.09}Al_5O_{12}$
$Lu_3Sc_{0.74}Al_{4.26}O_{12}$
$Yb_3Sc_{0.61}Al_{4.39}O_{12}$
$Tm_3Sc_{0.41}Al_{4.59}O_{12}$
$Er_3Sc_{0.23}Al_{4.77}O_{12}$
$Y_3Sc_{0.09}Al_{4.91}O_{12}$
$Ho_3Sc_{0.08}Al_{4.92}O_{12}$

The required thickness of the guiding layer (the layer in which the light is being propagated) is a function of the relative refractive indices of the guiding layer, the cladding layers, the wavelength of the light to be guided, and the number of modes which are to be transmitted. Procedures for calculating the thickness of the guiding layer based on these parameters are well known to those skilled in the art of optical waveguiding.

As to the thickness of the cladding layer, it is desirably at least several times as large as that of the waveguiding layer. Of course, there is no upper limit to the thickness, other than that dictated by practical considerations relating to construction, expense of application, etc. In practice, the thickness of the cladding layer should be large with respect to the ratio of the wavelength to the refractive index difference between waveguide and cladding layer. It can be made thinner if greater optical loss is tolerable under usual operating conditions at which the waveguide will be exposed to an environment of arbitrary refractive index. In general, the ratio of the thickness of the cladding layer to the ratio of the wavelength to the refractive index difference between waveguide and cladding layer should preferably be greater than 0.01, more preferably greater than 0.1. In practical operation, the thickness of the cladding layer will ordinarily be at least about 3 µm, more desirably at least about 10 µm; preferably at least about 25 µm, and more preferably yet at least about 100 µm.

Example 1

Preparation of $Ho_3Al_5O_{12}$ epitaxial waveguiding layers.

The procedure for the epitaxial growth of $Ho_3Al_5O_{12}$ layers on $Y_3Al_5O_{12}$ wafer substrates by liquid phase epitaxy is as follows. A single crystal wafer of $Y_3Al_5O_{12}$ is prepared from a cylindrical crystal boule by slicing, lapping, and polishing. Polishing proceeds through finer grit, and a final polish is done with a colloidal silica mixture, as is common for polishing garnet crystal wafers. The wafer is carefully cleaned and mounted in a substrate holder which allows rotation and translation. Epitaxy is achieved by dipping the substrate into a platinum crucible holding the molten constituent oxides of the $Ho_3Al_5O_{12}$ composition in the proportions listed below:

| Oxide | Mole Fraction | Moles | Grams |
|---|---|---|---|
| PbO | 0.90024 | 3.42798 | 765.089 |
| $Al_2O_3$ | 0.01959 | 0.07459 | 7.606 |
| $B_2O_3$ | 0.07502 | 0.28567 | 19.888 |
| $Ho_2O_3$ | 0.00516 | 0.01963 | 7.417 |

| Oxide | Mole Fraction | Moles | Grams |
|---|---|---|---|
| | 1.00000 | 3.80787 | 800.000 |

The melt composition set forth above can be specified by the parametric convention established by S.L. Blank, W.A. Biolsi and J.W. Nielsen, IEEE Trans. Magnetics MAG-13,1095 (1977), as follows:

$R_1$ = $Al_2O_3/Ho_2O_3$ = 3.8
$R_3$ = $PbO/2B_2O_3$ = 6.0
$R_4$ = $(Ho_2O_3 + Al_2O_3)/(Ho_2O_3 + Al_2O_3 + B_2O_3 + \frac{1}{2}PbO)$
    = 0.045.

These powders are heated to 1125° C., a temperature well above the melting point of the mixture, and allowed to "soak" for 24 hours. The melt is stirred for one hour at 1080° C. and 200 rev/min just before each layer growth. After stirring, the melt is cooled to the growth temperature of about 1015° C. in 45 minutes (melt saturation occurs at about 1030° C.).

The $Y_3Al_5O_{12}$ wafers, typically 1-, 2- or 3-inch in diameter by 0.020 inch thickness, are thermally equilibrated above the melt surface for five minutes, dipped 10 mm below the melt surface, and rotated at 200 rev/min. for a time sufficient to grow the desired layer thickness, typically 5-60 minutes. The $Ho_3Al_5O_{12}$ layer grows at a rate of about 1.0 µm/min. After growth, the substrate with the epitaxial layer is raised above the melt, and the residual flux is spun-off by rapid rotation of about 500 rev/min. Removal of the wafer from the furnace to room temperature proceeds over the course of 15 minutes. This slow exit rate prevents thermal shock and cracking of the wafers. This entire process is typically done in a class 100 laminar flow hood. Remaining traces of solidified growth solution on the wafers are removed in a 40% solution of nitric acid at 90° C.

EXAMPLES 2-5

Melts were prepared for the epitaxial crystal growth of aluminum garnet layers of composition $(Tb,Lu)_3Al_3O_{12}$, as detailed in Table 6, below:

TABLE 6

Composition of Melt in Grams for the Growth of Optical Waveguides of Composition $(Tb,Lu)_3Al_3O_{12}$ on YAG Substrates

| | PbO | $B_2O_3$ | $Al_2O_3$ | $Tb_2O_3$ | $Lu_2O_3$ |
|---|---|---|---|---|---|
| Example 2 | 602.71 | 15.67 | 5.30 | 3.25 | 1.90 |
| Example 3 | 602.71 | 15.67 | 5.99 | 3.85 | 1.97 |
| Example 4 | 602.71 | 15.67 | 5.99 | 3.85 | 1.97 |
| Example 5 | 477.14 | 12.40 | 5.30 | 3.25 | 1.90 |

Epitaxial layers of the approximate composition $Tb_{1.75}Lu_{1.25}Al_5O_{12}$ were grown by the liquid phase epitaxial crystal growth process detailed above on substrate wafers of YAG. Growth conditions and product properties were as set forth in Table 7, below. Light from a helium-neon gas laser was guided in these slab waveguides by the prism coupling technique, using a rutile prism. This waveguiding technique allowed measurement of the refractive index of the epitaxial layers also.

TABLE 7

Properties of Slab Waveguides of $(Lu,Tb)_3Al_5O_{12}$ Epitaxially Grown on YAG Substrates.

| Example No.: | 2 | 3 | 4 | 5 |
|---|---|---|---|---|
| Growth Temp (°C.): | 928.0 | 950.5 | 951.5 | 952.0 |
| Growth Rate (μm/min): | 0.78 | 1.48 | 0.90 | 3.53 |
| Thickness (μm): | 3.91 | 7.42 | 4.51 | 4.97 |
| Ref. Ind. (at 633 nm): | 1.8535 | 1.8544 | 1.8540 | 1.8547 |
| Lattice Const. (Angs.): | 11.9972 | 12.0073 | — | 12.0126 |

To further illustrate the waveguiding nature of these epitaxial layers, the effective refractive index of several of the guiding modes was measured at the 632.8 nm wavelength of a helium-neon laser. The results are illustrated in Table 8, below. Also shown in Table 8 are the calculated refractive indices for these modes, based on an ideal model of a step change of refractive index between the YAG substrate and the waveguiding layer.

TABLE 8

Guided Modes in the Slab Waveguide of $(Tb,Lu)_3Al_5O_{12}$ on YAG, of Example 3, at 632.8 nm.

| Mode Number | Calc. Ref. Index | Measured Ref. Index |
|---|---|---|
| 1 | 1.8539 | — |
| 2 | 1.8524 | 1.8525 |
| 3 | 1.8500 | 1.8501 |
| 4 | 1.8466 | 1.8466 |
| 5 | 1.8422 | 1.8423 |
| 6 | 1.8369 | 1.8370 |
| 7 | 1.8308 | 1.8313 |

Optical transmission loss measurements were made on the $(Lu,Tb)_3Al_5O_{12}$ slab waveguide of Example 3. Light was guided into the epitaxial layer by prism coupling using a rutile prism, and the intensity of scattered light along the waveguiding track was probed with a fiberoptic cable. Measurement of the light intensity along the track as a function of position gives the optical loss directly if reflected light from the edge of the wafer does not follow along the same track. Loss measurements along five different waveguiding tracks in the layer (Table 9) gave an optical loss of $1.1 \pm 1.2$ dB/cm. An optical loss of the order of 1 dB/cm is considered adequate for most applications.

TABLE 9

Optical Loss for a Guided Mode in $(Tb,Lu)_3Al_5O_{12}$ Layer (Example 4) at 632.8 nm

| Measurement No. | Loss (dB) | Path (cm) | dB/cm |
|---|---|---|---|
| 1 | 0.6 | 1.0 | 0.6 |
| 2 | 1.4 | 1.2 | 1.2 |
| 3 | 1.1 | 1.2 | 0.9 |
| 4 | 1.1 | 0.6 | 1.8 |
| 5 | 0.5 | 0.5 | 1.0 |

EXAMPLE 6

A melt was prepared for the epitaxial crystal growth of aluminum garnet layers of composition $(Tb,Lu)_3Al_5O_{12}$, by melting together the oxides in the following proportions:
PbO: 765.12 g;
$B_2O_3$: 19.89 g;
$Al_2O_3$: 7.61 g
$Tb_2O_3$: 4.88 g
$Lu_2O_3$: 2.50 g An epitaxial layer of the approximate composition $Tb_{1.75}Lu_{1.25}Al_5O_{12}$ was grown at 958° C. at a growth rate of 1.97 μm/min. by the liquid phase epitaxial crystal growth process detailed above on a substrate wafer of YAG. The thickness of the epitaxial layer was measured to be 9.8μm. An optical loss measurement at 632.8 nm was performed on this slab waveguide using the dual prism method, wherein light is coupled into the waveguide by a prism made of the high refractive index material rutile, and then extracted from the waveguide by another rutile prism. The distance between prisms fixes the optical path length, and the optical loss is readily calculated from measurement of the intensity of the incident and the recovered light. The optical loss for this waveguide wa found to be 1.22 dB/cm.

EXAMPLES 7-8

A melt was prepared for the epitaxial crystal growth of aluminum garnet layers of composition $(Tb,Lu)_3Al_5O_{12}$, by melting together the oxides in the following proportions:
PbO: 760.10 g;
$B_2O_3$: 19.76 g;
$Al_2O_3$: 10.24 g
$Tb_2O_3$: 6.96 g
$Lu_2O_3$: 2.94 g This melt composition can be described more generally by the following molar ratios of the components:

$$Al_2O_3/(Tb_2O_3 + Lu_2O_3) + 3.8$$

$$PbO/2B_2O_3 = 6$$

$$(Al_2O_3 + Tb_2O_3 + Lu_2O_3 B_2O_3 + 1/2 PbO) = 0.06$$

$$Tb_2O_3/Tb_2O_3 + Lu_2O_3) = 0.72$$

$$Lu_2O_3/(Tb_2O_3 + Lu_2O_3) = 0.28$$

This melt has a saturation temperature of about 1070° C. and a growth temperature of about 1055° C. Epitaxial layers of the approximate composition $Tb_{1.75}Lu_{1.25}Al_5O_{12}$ were grown from this melt on YAG substrate wafers to be overcoated with a cladding layer of YAG in order to fabricate clad waveguides of aluminum garnet.

A melt for the liquid phase epitaxy of YAG was formulated with the composition listed below to overcoat the optical waveguiding layer of $(Tb,Lu)_3Al_5O_{12}$ with a cladding layer of YAG.
PbO: 765.24 g;
$B_2O_3$: 19.89 g;
$Al_2O_3$: 9.40 g
$Y_2O_3$: 5.48 g This melt produced epitaxial layers of YAG at a growth temperature of about 1095° C. at a growth rate of about 1.5 μm/min. Two (Tb,Lu)-aluminum garnet optical waveguides prepared previously on YAG wafers were epitaxially clad with YAG by this melt. The properties of the finished clad waveguides (Guide A and Guide B) were as follows:

|  | Guide A | Guide B |
|---|---|---|
| Guiding Layer: | | |
| layer thickness (μm) | 25.6 | 11.8 |
| growth rate (μm/min) | 1.71 | 2.36 |
| refrective index at 632.8 nm | 1.8545 | 1.8545 |
| Clad Layer | | |
| layer thickness (μm) | 3.26 | 2.83 |
| growth rate (μm/min) | 1.63 | 1.41 |
| refractive index at 632.8 nm | 1.8284 | 1.8288 |

Polarization is a consequence of the nature of electromagnetic waves. An electromagnetic wave contains two fields, one electric and one magnetic, oscillating perpendicular to each other and propagating in a direction perpendicular to both. Unpolarized light is made up of many waves with their electric and magnetic fields oriented randomly. If all the electric fields (and, hence, the magnetic fields as well) were aligned parallel to one another, the light would be linearly polarized.

In an ideal waveguide the linear polarization will be maintained. However, it is known that the linearly polarized light in an actual waveguide is coupled into modes of different polarization, so that light that has traveled some distance in the waveguide emerges unpolarized. This change in the polarization state can be attributed to deformations of the film from its symmetry or to anisotropy of the waveguide material.

In single mode waveguides, the loss of linear polarization can be described as a coupling process between orthogonally polarized modes. There are always two modes of the same kind, but with transverse electric field components that are polarized perpendicular to each other. Film deformations or anisotropies of the waveguide material couple these orthogonally polarized modes to each other causing the polarization of the superposition field of all the modes to change. In multimode waveguides the picture is further complicated by the fact that all the modes couple to their perpendicularly polarized counterparts, so that the polarization of the total wave field becomes random resembling the polarization state of incoherent light.

For some fiber optic sensors and advanced communication systems, it is required that the optical waveguides have polarization preserving properties. Two types of polarization-sensitive single-mode waveguides are available commercially. One type is a true single-polarization waveguide that can transmit light in one linear polarization but not in the other. The other type is polarization-maintaining; that is, it maintains the polarization of the light that originally entered the waveguide by isolating the two orthogonal polarizations from each other while they travel down the same single-mode guide.

Although both single-polarization and polarization-maintaining fiber waveguides are available today, polarization-preserving planar waveguides are still desired for many applications, and high temperature polarization preserving planar waveguides are preferred for special applications. It is known that stress will induce birefringence in a material and that lattice constant mismatch between crystal layers will induce stress. Epitaxial waveguiding layers of aluminum garnet on aluminum garnet substrates were prepared to obtain planar birefringent waveguides. When linearly polarized light enters such waveguides in certain orientations, the linear polarization will be preserved by the stress-induced birefringence.

Usually light is neither totally polarized nor unpolarized but a mixture of the two types. Thus, the two orthogonal plane polarized components representing the wave will have unequal amplitudes. In such a case, it is said that the light is partially polarized. A measure of this condition is the degree of polarization V defined as $$V = I_p/(I_p + I_u)$$

Here $I_p$ and $I_u$ are the constituent flux densities of polarized and unpolarized light, respectively. Clearly $I_p + I_u$ is the total irradiance and V is then simply the fractional polarized component.

EXAMPLE 9

Figure 4:
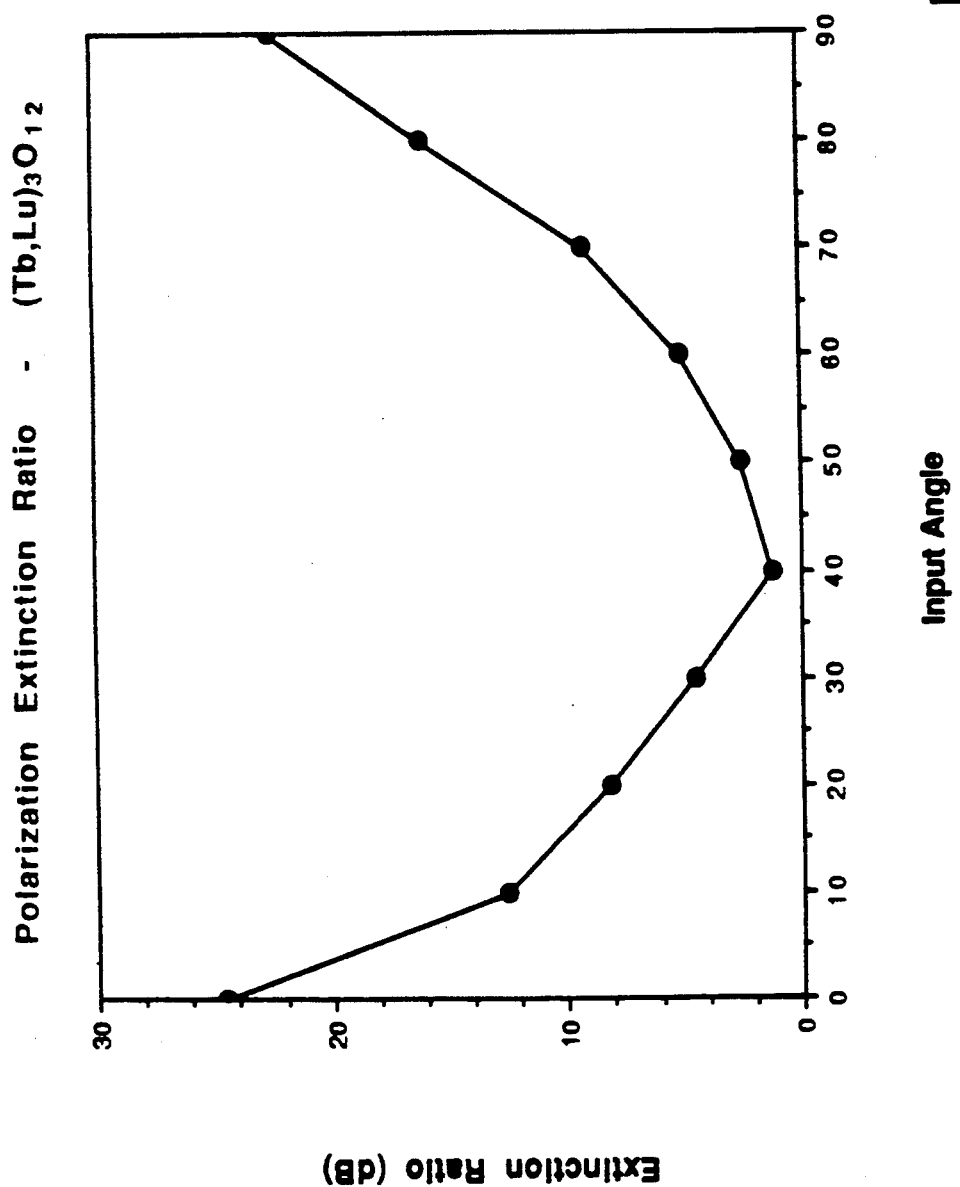
FIG. 4 shows the polarization extinction ratio vs. input angle in birefringent planar waveguide of the present invention having a stressed wave propagating $(Tb,Lu)_3Al_5O_{12}$ layer epitaxially deposited on a lower refractive index yttrium aluminum garnet $(Y_3Al_5O_{12}, YAG)$ layer.

Polarization preservation in aluminum garnet waveguides, as illustrated by $(Tb,Lu)_3Al_5O_{12}$ epitaxial waveguiding layers on YAG To measure the polarization preserving properties of epitaxial waveguides of aluminum garnet, a 50 μm thick epitaxial layer of $(Tb,Lu)_3Al_5O_{12}$ was prepared on one side of a 2.54 cm diameter 0.5 mm thick substrate wafer of $Y_3Al_5O_{12}$. Polarized light with a polarization extinction ratio (defined as $(I_{max} - I_{min})/(I_{max} + I_{min})$) of 26.2 dB, was coupled into this waveguide, and the angle of polarization with respect to the plane of the waveguide was rotated in 10° increments. At each orientation the polarization extinction ratio of the light coupled out of the waveguide was measured. The results are shown in FIG. 4 as the polarization extinction ratio of the $(Tb,Lu)_3Al_5O_{12}$ waveguide as a function of the angle of polarization of the incident light. For light polarized along the normal of the waveguide (parallel to the optic axis), it was found that the polarization extinction ratio of the exiting wave was 24.6 dB, or a reduction of 1.6 dB. For light polarized in the plane of the waveguide (at 90° to the optic axis), the polarization extinction ratio was 22.4 dB, or a reduction of 3.8 dB. As is to be expected, for light polarized at angles between these extremes the exiting light will be elliptically polarized, as can be seen from FIG. 4.

EXAMPLE 10

Birefringence of $(Tb, Lu)_3Al_5O_{12}$ epitaxial waveguiding layers on YAG

When linearly polarized light impinges on a birefringent crystal with its optical axis 90° to the propagation direction, the light will decompose into two orthogonally polarized components, one polarized parallel to the optic axis and the other polarized at 90° to the optic axis. As both beams pass through the birefringent crystal, they see different polarizations of the electrons and, therefore, experience different refractive indices. As a result, the waves will develop a phase difference as they pass through the crystal. This phase difference depends on the difference in refractive indices, the path length through the crystal, and the wavelength of the light.

When a broadband LED or other broadband source is chosen as the light source, the birefringence of the crystal will induce an intensity modulation, or fringes, on the light spectrum. The number of fringes in a given wavelength interval is $$N = B\,d\,(1/\lambda_1 - 1/\lambda_2)$$

where B is the birefringence, d is the pathlength through the crystal, and $\lambda_1$ and $\lambda_2$ are the lower and upper wavelength limit of the spectrum, respectively. In theory, linear strain is anticipated with lattice constant mismatch, so that linear elasticity may be used to compute the linear stress at the interface between an epitaxial layer of $Ho_3Al_5O_{12}$ and a $Y_3Al_5O_{12}$ substrate. $Ho_3Al_5O_{12}$ may be prepared on $Y_3Al_5O_{12}$ with at least a 0.01% lattice mismatch. From one-dimensional linear elasticity, the strain is $$e = dl/l = 0.01\% = 0.0001.$$

Using Hooke's law, the stress is $$s = Ee = 4.1615 \times 10^7 \times 0.0001 = 4161.5 \text{ psi}.$$

where $E = 4.1615 \times 10$; is the Young's Modulus of YAG. The photoelastic constant $dB/ds$ of YAG at room temperature is $7.973 \times 10^{-4}/\text{psi}$. Using this value of $dB/ds$ for HoAG, the stress-induced birefringence is $$B = dB/ds \times s = 3.3 \times 10^{-4}.$$

A SPEX 0.22 Spectrometer was used to measure the birefringence of $(Tb,Lu)_3Al_5O_{12}$ waveguiding layers on $Y_3Al_5O_{12}$. Light from a wide band source was collimated through a microscope lens and coupled into the waveguides. These waveguides were placed between a pair of crossed polarizers. The birefringence of these planar waveguides was determined by using a white light source (450 nm to 750 nm) and measuring the number of fringes, or using a broad-band light-emitting diode (LED) (760 nm to 840 nm) as the light source to measure the number of fringes.

Figure 5:
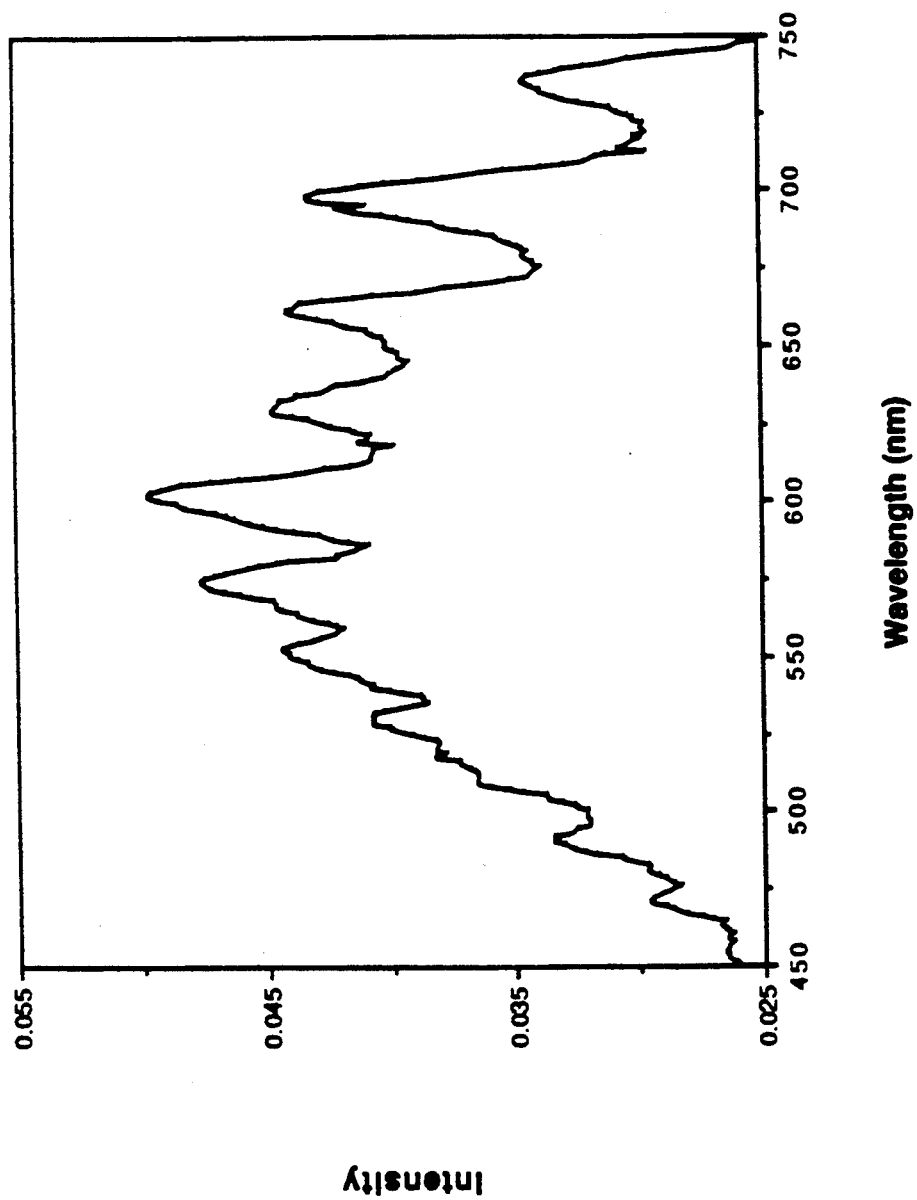
FIGS. 5 and 6 show transmission intensity vs. wavelength in two different stressed birefringent (Tb,Lu) aluminum garnet waveguides epitaxially deposited on a YAG substrate.
Figure 6:
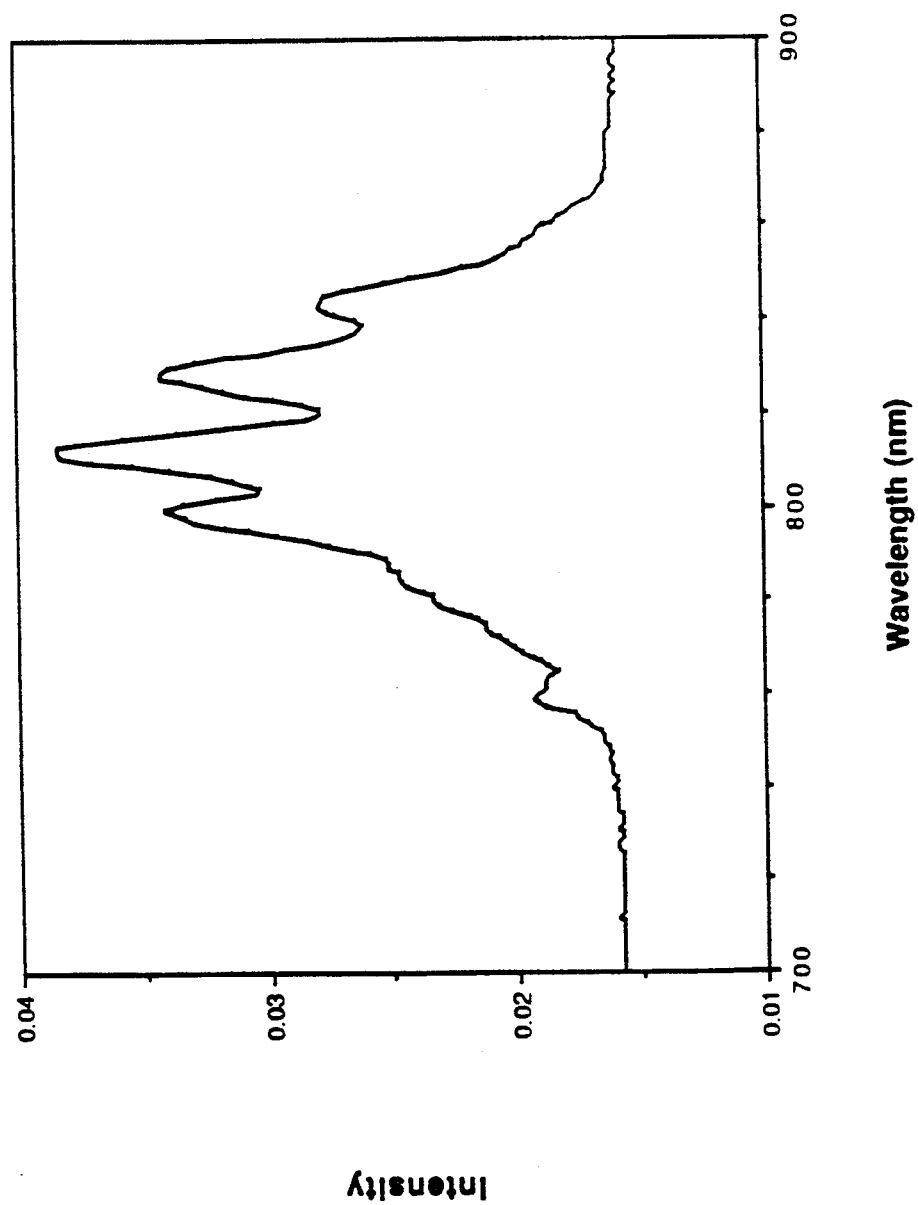

For 16.86 $\mu$m $(Tb,Lu)_3Al_5O_{12}$ waveguiding layers prepared on each side of a $Y_3Al_5O_{12}$ wafer substrate, it was found that the birefringence was $0.668 \times 10^{-3}$ (see FIG. 5). For a 50.25 $\mu$m $(Tb,Lu)_3Al_5O_{12}$ waveguiding layer prepared on one side of a $Y_3Al_5O_{12}$ wafer substrate, it was found that the birefringence was $4.08 \times 10^{-3}$ (see FIG. 6).

EXAMPLES 11-12

Birefringence of $Ho_3Al_5O_{12}$ epitaxial waveguiding layers on YAG

Figure 7:
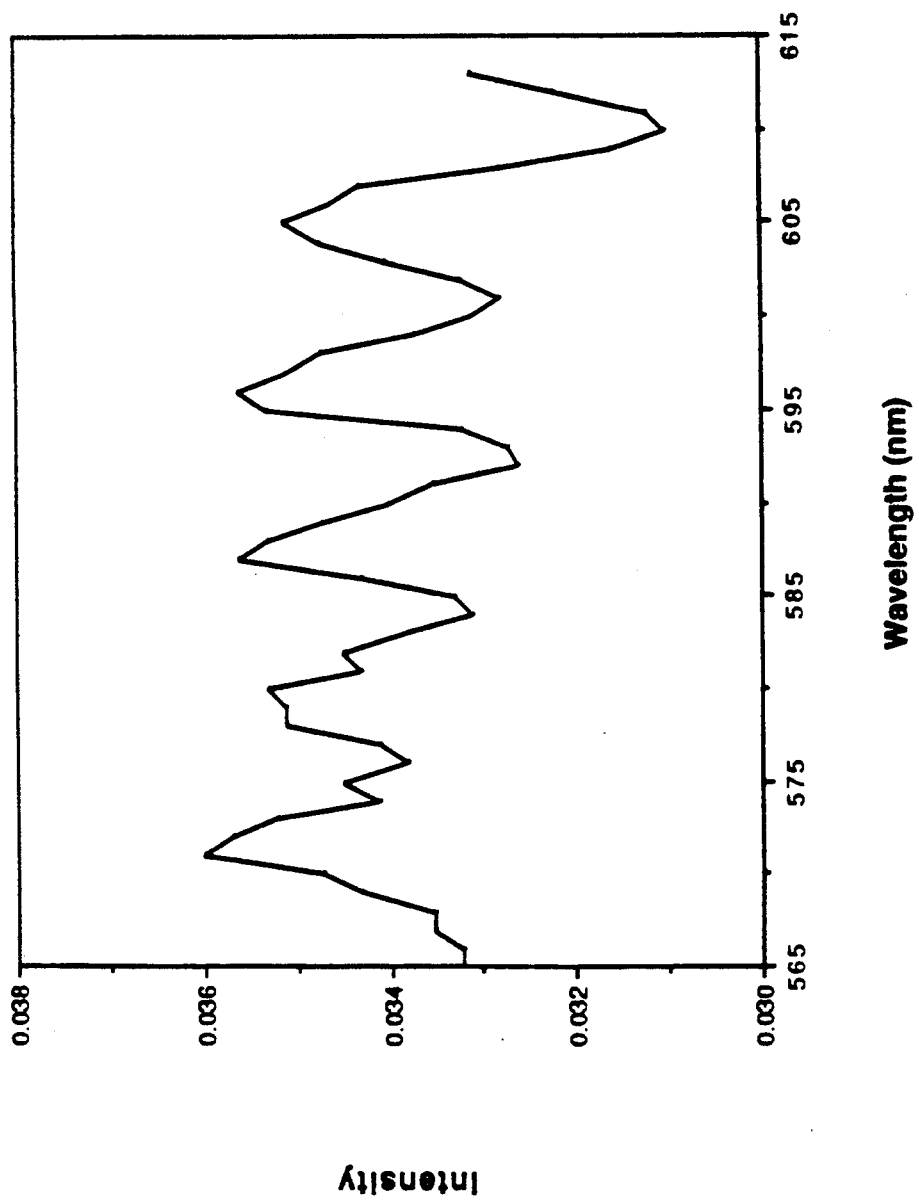
FIGS. 7 and 8 show transmission intensity vs. wavelength in two different stressed birefringent holmium aluminum garnet waveguides epitaxially deposited on a YAG substrate.
Figure 8:
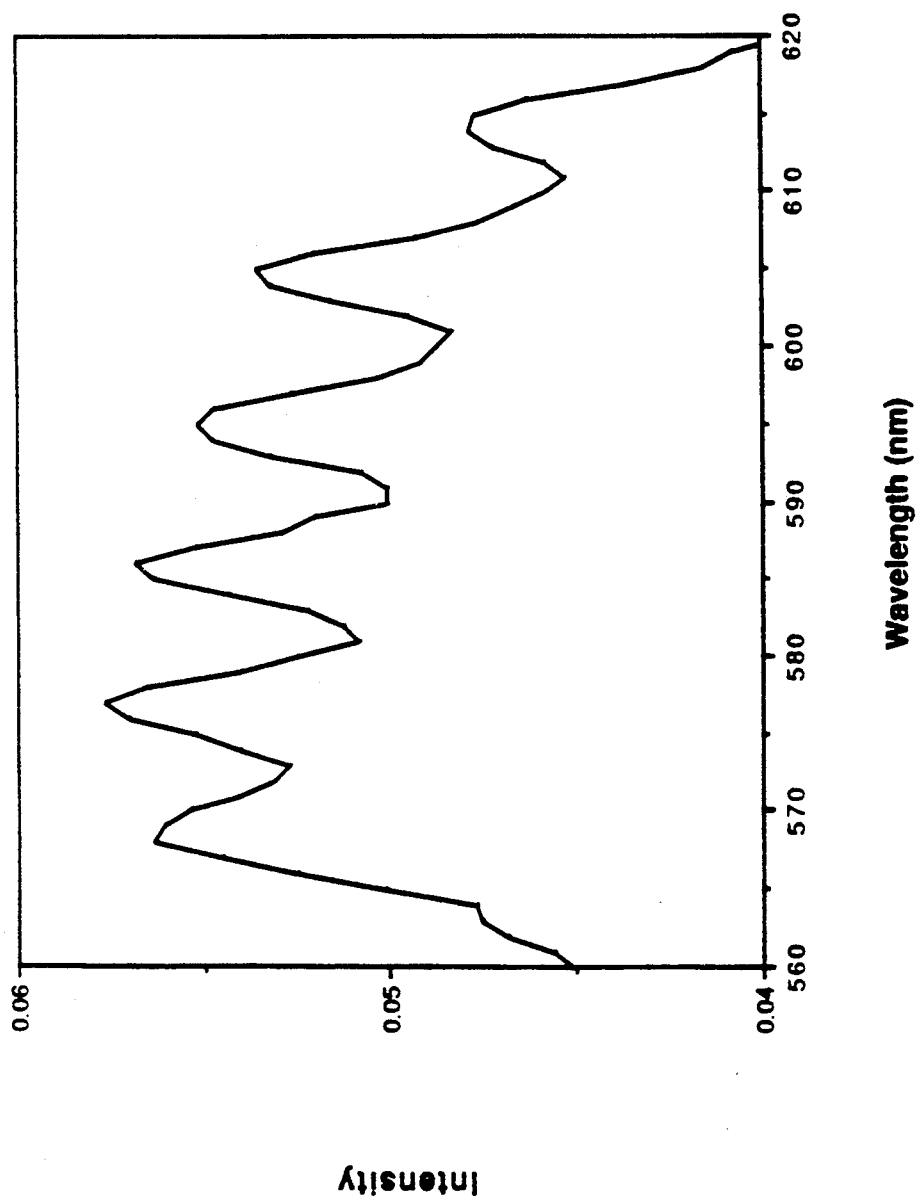

The birefringence of two $Ho_3Al_5O_{12}$ waveguiding layers prepared on $Y_3Al_5O_{12}$ wafer substrates was evaluated with a white light source (560 nm–620 nm) and a broad-band LED (750 nm–850 nm). It was found that the birefringence was $3.05 \times 10^{-3}$ for the first specimen (see FIG. 7), and that the birefringence was $2.55 \times 10^{-3}$ for the second specimen (see FIG. 8).

The waveguides of the present invention are particularly suited for controlled transmission of light in high temperature environments, as, for example, for optical controls of turbine engines, and the like.

Since various changes may be made in the invention without departing from its spirit and essential characteristics, it is intended that all matter contained in the description shall be interpreted as illustrative only and not in a limiting sense, the scope of the invention being defined by the appended claims.

We claim:

1. An optical waveguide structure comprising, in combination, a waveguiding body composed of a first crystalline aluminum garnet, and a cladding comprising an epitaxially deposited layer of a second crystalline aluminum garnet, wherein said second crystalline aluminum garnet has a lower refractive index than said first crystalline aluminum garnet, and wherein the lattice dimensions between said first and said second crystalline aluminum garnet are sufficiently different to impose a strain of at least 0.001% on said first crystalline aluminum garnet waveguiding body, thereby causing a stress with resultant birefingence in said first crystalline aluminum garnet waveguiding body 2. The optical waveguide of claim 1 wherein the aluminum garnets for the higher refractive index body of the waveguide and for the epitaxial cladding layer are selected from aluminum garnets of the composition

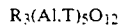
$$R_3(Al,T)_5O_{12}$$

wherein
R represents one or more of the elements selected from the group consisting of calcium, magnesium, sodium, strontium, yttrium, lanthanum, praseodymium, neodymium, samarium, europium, gadolinium, terbium, dysprosium, holmium, erbium, thulium, ytterbium and lutetium; and T represents one or more of the 3-valent elements selected from the group consisting of gallium, indium, and scandium;

with the provisos that
(1) the molar ratio of the combined concentration of indium plus scandium to aluminum does not exceed 2 : 3; and that (2) if R is one or more of $Na^{+1}$, $Ca^{+2}$, $Mg^{+2}$ or $Sr^{+2}$, then T must include one or more charge-compensating ions selected from the group consisting of $Fe^{+4}$, $Ge^{+4}$, $Hf^{+4}$, $Ir^{+4}$, $Mo^{+4}$, $Nb^{+4}$, $Os^{+4}$, $Pb^{+4}$, $Pt^{+4}$, $Re^{+4}$, $Rh^{+4}$, $Ru^{+4}$, $Si^{+4}$, $Sn^{+4}$, $Ta^{+4}$, $Ti^{+4}$, $Zr^{+4}$, $V^{+4}$, $W^{+4}$, $As^{+5}$, $Mo^{+5}$, $Re^{+5}$, $Sb^{+5}$, $Ta^{+5}$, $U^{+5}$, $V^{+5}$, $Mo^{+6}$, $Re^{+6}$, $W^{+6}$, and $Re^{+7}$, in proportions sufficient to achieve an average cation charge of three in the crystal.

3. The optical waveguide of claim 2 wherein the aluminum garnets for the higher refractive index body of the waveguide and for the epitaxial cladding layer are selected from aluminum garnets of the composition

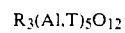
$$R_3(Al,T)_5O_{12}$$

wherein
R represents one or more of the elements selected from the group consisting of calcium, magnesium, yttrium, lanthanum, praseodymium, neodymium, samarium, europium, gadolinium, terbium, dysprosium, holmium, erbium, thulium, ytterbium and lutetium; and T represents one or more of the 3-valent elements selected from the group consisting of gallium, indium, and scandium;

with the provisos that
(1) the molar ratio of the combined concentration of indium plus scandium to aluminum does not exceed 2 : 3; and that (2) if R is one or both of $Ca^{+2}$ and $Mg^{+2}$, then T includes one or both of $Ge^{+4}$ and $Si^{+4}$ in equimolar concentration relative to the $Ca^{+2}$ and/or $Mg^{+2}$ to achieve an average cation charge of three in the crystal.

4. The optical waveguide of claim 1 wherein the body of the waveguide is an aluminum garnet selected from the composition $(Y,Lu)_3(Al,In)_5O_{12}$, $(Y,Lu)_3(Al,Sc)_5O_{12}$, $(Tb,Lu)_3(Al,In)_5O_{12}$, $(Tb,Lu)_3(Al,Sc)_5O_{12}$, $(Tb,Lu)_3Al_5O_{12}$, $Ho_3(Al,In)_5O_{12}$, $Ho_3(Al,Sc)_5O_{12}$ and $Ho_3Al_5O_{12}$.

5. The optical waveguide of claim 4 wherein the epitaxial cladding layer is yttrium aluminum garnet.

6. The optical waveguide of claim 4 wherein the body of the waveguide has the composition $Ho_3Al_5O_{12}$ and the epitaxial cladding layer is yttrium aluminum garnet.

7. The optical waveguide of claim 4 wherein the body of the waveguide has the composition $Tb_{1.75}Lu_{1.25}Al_5O_{12}$ and the epitaxial cladding layer is yttrium aluminum garnet.

8. The optical waveguide of claim 3 comprising an yttrium aluminum garnet base, having epitaxially deposited thereon an aluminum garnet waveguiding body of the composition $R_3(Al,T)_5O_{12}$ having a higher refractive index than said yttrium aluminum garnet, and having an epitaxial cladding layer of yttrium aluminum garnet on said aluminum garnet of the composition $R_3(Al,T)_5O_{12}$.

9. The optical waveguide of claim 8 wherein said aluminum garnet waveguiding body is in the form of a waveguiding rib.

10. The optical waveguide of claim 9 wherein said waveguiding rib is located within a channel formed in the yttrium aluminum garnet base.

11. The optical waveguide of claim 3 having a waveguiding body in the form of an elongated waveguiding member, having deposited thereon an epitaxial cladding layer of an aluminum garnet having a lower refractive index than said waveguiding body.

12. The optical waveguide of claim 11 wherein said elongated waveguiding member is an optical slab.

13. The optical waveguide of claim 12 wherein the epitaxial cladding layer is yttrium aluminum garnet.

14. The optical waveguide of claim 13 wherein the optical slab is an aluminum garnet selected from the composition $(Y,Lu)_3(Al,In)_5O_{12}$, $(Y,Lu)_3(Al,Sc)_5O_{12}$, $(Tb,Lu)_3(Al,In)_5O_{12}$, $(Tb,Lu)_3(Al,Sc)_5O_{12}$, $(Tb,Lu)_3Al_5O_{12}$, $Ho_3(Al,In)_5O_{12}$, $Ho_3(Al,Sc)_5O_{12}$ and $Ho_3Al_5O_{12}$.

15. The method for forming an optical waveguide according to claim 1 which comprises providing a base of a first aluminum garnet, epitaxially depositing thereon a second aluminum garnet having a higher refractive index than said first aluminum garnet, and epitaxially depositing on said second aluminum garnet a third aluminum garnet cladding layer having a lower refractive index than said second aluminum garnet.

16. The method of claim 15 wherein said first and said third aluminum garnet have the same composition.

17. The method of claim 16 wherein said first and said third aluminum garnet are both yttrium aluminum garnet.

18. The method of claim 17 wherein said second aluminum garnet is selected from the composition $(Y,Lu)_3(Al,In)_5O_{12}$, $(Y,Lu)_3(Al,Sc)_5O_{12}$, $(Tb,Lu)_3(Al,In)_5O_{12}$, $(Tb,Lu)_3(Al,Sc)_5O_{12}$, $(Tb,Lu)_3Al_5O_{12}$, $Ho_3(Al,In)_5O_{12}$, $Ho_3(Al,Sc)_5O_{12}$ and $Ho_3Al_5O_{12}$.

19. The method for making an elongated optical waveguide according to claim 1 which comprises forming an elongated waveguiding body of a first aluminum garnet, and epitaxially depositing thereon a second aluminum garnet having a lower refractive index than said first aluminum garnet.

20. The method of claim 19 wherein said elongated waveguiding body is an optical slab, and said second aluminum garnet is yttrium aluminum garnet.

21. The method of claim 20 wherein said optical fiber is an aluminum garnet having a composition selected from the group consisting of $(Y,Lu)_3(Al,In)_5O_{12}$, $(Y,Lu)_3(Al,Sc)_5O_{12}$, $(Tb,Lu)_3(Al,In)_5O_{12}$, $(Tb,Lu)_3(Al,Sc)_5O_{12}$, $(Tb,Lu)_3Al_5O_{12}$, $Ho_3(Al,In)_5O_{12}$, $Ho_3(Al,Sc)_5O_{12}$ and $Ho_3Al_5O_{12}$.

* * * * *